(12) United States Patent
Kinoshita et al.

(10) Patent No.: US 9,040,199 B2
(45) Date of Patent: May 26, 2015

(54) POSITIVE ELECTRODE ACTIVE MATERIAL PARTICLES FOR LITHIUM ION SECONDARY BATTERIES, POSITIVE ELECTRODE USING THE SAME, AND LITHIUM ION SECONDARY BATTERY

(75) Inventors: Masahiro Kinoshita, Osaka (JP); Kensuke Nakura, Osaka (JP)

(73) Assignee: PANASONIC INTELLECTUAL PROPERTY MANAGEMENT CO., LTD, Osaka (JP)

( * ) Notice: Subject to any disclaimer, the term of this patent is extended or adjusted under 35 U.S.C. 154(b) by 565 days.

(21) Appl. No.: 13/510,876

(22) PCT Filed: Aug. 10, 2011

(86) PCT No.: PCT/JP2011/004520
§ 371 (c)(1),
(2), (4) Date: May 18, 2012

(87) PCT Pub. No.: WO2012/042727
PCT Pub. Date: Apr. 5, 2012

(65) Prior Publication Data
US 2012/0231334 A1    Sep. 13, 2012

(30) Foreign Application Priority Data
Sep. 27, 2010    (JP) ................................. 2010-215977

(51) Int. Cl.
*H01M 4/58* (2010.01)
*B82Y 30/00* (2011.01)
*H01M 4/36* (2006.01)

(52) U.S. Cl.
CPC ............ *H01M 4/5825* (2013.01); *B82Y 30/00* (2013.01); *C01P 2002/72* (2013.01);
(Continued)

(58) Field of Classification Search
USPC ...................................................... 429/218.1
See application file for complete search history.

(56) References Cited

U.S. PATENT DOCUMENTS 6,458,488 B1    10/2002  Honbo et al.
8,841,023 B2 *   9/2014  Abe et al. ...................... 429/188
(Continued)

FOREIGN PATENT DOCUMENTS

CN    101740752 A    6/2010
JP    2001-110421    4/2001
(Continued)

OTHER PUBLICATIONS

International Search Report issued in International Patent Application No. PCT/JP2011/004520, mailed Nov. 1, 2011.
(Continued)

*Primary Examiner* — Patrick Ryan
*Assistant Examiner* — Lucas J O'Donnell
(74) *Attorney, Agent, or Firm* — McDermott Will & Emery LLP (57) ABSTRACT

Positive electrode active material particles for lithium ion secondary batteries include: a core particle including a first olivine-structured, lithium-containing phosphate compound which includes Fe and/or Mn and Li; and a shell layer attached to the surface of the core particle. The shell layer includes a second olivine-structured, lithium-containing phosphate compound which includes Fe and/or Mn and Li. At least the core particle includes a phosphorous compound represented by the formula (1): $Me_mP_nO_p$, where Me is Fe and/or Mn, $0<m\le3$, $0<n\le3$, and $0\le p\le5$; a content C1 of the phosphorous compound in the core particle is 0.5 to 3 mol %; and when the shell layer includes the phosphorous compound represented by the formula (1), a content C2 of the phosphorous compound in the shell layer is smaller than the C1.

11 Claims, 2 Drawing Sheets (52) U.S. Cl.
CPC ........ *C01P 2002/88* (2013.01); *C01P 2004/62* (2013.01); *C01P 2004/64* (2013.01); *C01P 2004/84* (2013.01); *C01P 2006/40* (2013.01); *H01M 4/366* (2013.01)

(56) References Cited

U.S. PATENT DOCUMENTS

| | | | |
|---|---|---|---|
| 2007/0031732 A1* | 2/2007 | Chiang et al. | 429/231.95 |
| 2009/0186277 A1* | 7/2009 | Beck et al. | 429/221 |
| 2010/0163790 A1 | 7/2010 | Ceder et al. | |
| 2010/0203388 A1 | 8/2010 | Kim et al. | |
| 2011/0020703 A1 | 1/2011 | Suzuki et al. | |
| 2011/0300292 A1* | 12/2011 | Yang et al. | 427/126.1 |
| 2012/0264018 A1 | 10/2012 | Kong et al. | |

FOREIGN PATENT DOCUMENTS

| | | |
|---|---|---|
| JP | 2006-066081 | 3/2006 |
| JP | 2006-073259 | 3/2006 |
| JP | 2007-220390 | 8/2007 |
| JP | 2008-034306 | 2/2008 |
| JP | 2010-108928 | 5/2010 |
| WO | WO 2009/057834 A1 | 5/2009 |
| WO | WO 2009/123232 A1 | 10/2009 |

OTHER PUBLICATIONS

Chinese Office Action issued in corresponding Chinese patent Application No. 201180004592.9 dated Mar. 10, 2014, w/Partial English translation.

* cited by examiner

POSITIVE ELECTRODE ACTIVE MATERIAL PARTICLES FOR LITHIUM ION SECONDARY BATTERIES, POSITIVE ELECTRODE USING THE SAME, AND LITHIUM ION SECONDARY BATTERY

RELATED APPLICATIONS

This application is the U.S. National Phase under 35 U.S.C. §371 of International Application No. PCT/JP2011/004520, filed on Aug. 10, 2011, which in turn claims the benefit of Japanese Application No. 2010-215977, filed on Sep. 27, 2010, the disclosures of which Applications are incorporated by reference herein.

TECHNICAL FIELD

The present invention relates to a lithium ion secondary battery using an olivine-structured, lithium-containing phosphate compound as a positive electrode active material, and specifically relates to improvement in positive electrode active material particles.

BACKGROUND ART

Olivine-structured, lithium-containing phosphate compounds (hereinafter, also simply referred to as olivine-structured active materials) such as $LiFePO_4$ and $LiMnPO_4$ are known as positive electrode active materials for lithium ion secondary batteries, being excellent in thermal stability and low in cost. However, an olivine-structured active material is higher in electric resistance, compared to a hexagonal, layer-structured metal composite oxide such as a lithium cobalt composite oxide that has been widely used from the past. Therefore, there was the disadvantage of its slowing down intercalation and release reactions of lithium ions, and causing low discharge capacity at times of high rates. Also, when an olivine-structured active material deteriorates due to repeated charge and discharge of the battery, metal elements such as Fe and Mn are likely to be eluted into the non-aqueous electrolyte. Therefore, there was also the disadvantage of its causing deposition of the eluted Fe and Mn onto the negative electrode surface, resulting in capacity drops and internal short circuits in the battery and thus causing deterioration in cycle characteristics of the battery. Such elution of metal elements is remarkable, particularly in instances where charge and discharge are repeated under high temperatures.

With the aim to suppress elution of Fe from an olivine-structured active material, PTL 1 discloses forming a coating layer of a lithium compound on the surface of olivine-structured active material particles. Also, PTL 2 discloses forming a conductive carbon layer on the surface of olivine-structured active material particles which include iron or manganese, or between such particles. By forming a conductive carbon layer, PTL 2 aims to suppress elution of Fe and Mn from an olivine-structured positive electrode active material, and also, to make the olivine-structured active material, conductive.

In addition, with the aim to provide lithium ion secondary batteries with higher capacity and longer life, PTL 3 discloses a positive electrode active material for lithium ion secondary batteries, the active material including a composite oxide represented by the following formula:

where: D is one or more selected from Ni, Fe, Co, Cu, and Cr; Q is one or more selected from C, N, S, P, Si, F, Cl, I and Br; and x, a, b, c, and d have ranges of $0 \leq x \leq 1.1$, $0 \leq a \leq 0.5$, $0.05 \leq b \leq 1.0$, $0.000001 \leq c < 0.05$, and $0 \leq d \leq 0.1$, respectively. PTL 3 also discloses making the concentration of the element Q higher on the surface layer of the particles than in the inside thereof.

CITATION LIST

Patent Literatures

[PTL 1] Japanese Laid-Open Patent Publication No. 2006-66081
[PTL 2] Japanese Laid-Open Patent Publication No. 2008-34306
[PTL 3] Japanese Laid-Open Patent Publication No. 2001-110421

SUMMARY OF INVENTION

Technical Problem

An olivine-structured active material is formed by baking various raw materials, including a phosphoric acid compound. An olivine-structured active material includes an olivine-structured, lithium-containing phosphate compound as its main component, but depending on production conditions, it may include as impurities, metal phosphides such as iron phosphide ($Fe_2P$) and manganese phosphide ($Mn_2P$). Fe and Mn included in metal phosphides tend to be readily eluted into a non-aqueous electrolyte. With respect to impurities such as metal phosphides, since they tend to be readily generated on the surface side of the active material particles during baking, it is likely that elution of Fe and Mn would be remarkable.

In PTLs 1 and 2, elution of Fe and Mn are sought to be suppressed by forming a coating layer on the surface of olivine-structured active material particles. Also, in PTL 3, concentration of elements such as phosphorus is increased on the surface side of the active material particles. However, depending on the kinds of components which compose the coating layer and the surface layer, there are instances of increased resistance which adversely affect rate characteristics. Also, there are instances where the effect of suppressing elution of Fe and Mn becomes insufficient, thereby causing deterioration in cycle characteristics. Further, there are instances of reduction in capacity density due to the active material decreasing in proportion to the coating layer or to the surface layer having different elemental compositions.

Solution to Problem

The present invention aims to improve rate characteristics, and to also improve cycle characteristics even at high temperatures, in a lithium ion secondary battery including an olivine-structured active material as a positive electrode active material.

As described above, Fe and Mn are likely to be eluted from an olivine-structured active material, in instances where impurities such as metal phosphides are included therein. Therefore, in producing an olivine-structured active material, a production requirement requiring that generation of such metal phosphides be prevented as much as possible, or be made as less as possible, has been selected until now. However, from experiments, the present inventors found that having a specific phosphorous compound, such as the above metal phosphides, be present in an olivine-structured active material to a certain extent, enabled the active material to be highly conductive, thereby improving rate characteristics.

They also found that a core-shell structure of a specific composition enabled suppression of Fe and Mn, which originate from the phosphorous compound included in the core particle, being eluted into the non-aqueous electrolyte, thereby improving cycle characteristics at high temperatures.

One aspect of the present invention relates to positive electrode active material particles for lithium ion secondary batteries, the particles each comprising a core particle and a shell layer attached to the surface of the core particle, wherein: the core particle comprises a first olivine-structured, lithium-containing phosphate compound including at least one metal element selected from the group consisting of iron (Fe) and manganese (Mn), and lithium (Li); the shell layer comprises a second olivine-structured, lithium-containing phosphate compound including at least one metal element selected from the group consisting of Fe and Mn, and Li; at least the core particle includes a phosphorous compound represented by the following formula (1):

$$Me_mP_nO_p \qquad (1)$$

where Me is at least one metal element selected from the group consisting of Fe and Mn, 0≤m≤3, 0<n≤3, and 0≤p≤5; a content C1 of the phosphorous compound relative to the total moles of the first olivine-structured, lithium-containing phosphate compound and the phosphorous compound in the core particle, is 0.5 to 3 mol %; and when the shell layer includes the phosphorous compound represented by the formula (1), a content C2 of the phosphorous compound relative to the total moles of the second olivine-structured, lithium-containing phosphate compound and the phosphorous compound in the shell layer, is smaller than the content C1. By using the above positive electrode active material particles for the positive electrode active material, it is possible to obtain a lithium ion secondary battery that is excellent in rate characteristics and in cycle characteristics at high temperatures.

The phosphorous compound preferably includes at least one selected from the group consisting of iron phosphides and manganese phosphides, in terms of production efficiency.

In addition, the proportion of the average thickness of the shell layer, relative to the average radius of the positive electrode active material particle, is preferably in the range of 0.1 to 50%, in terms of obtaining excellent balance between: rate characteristics; and cycle characteristics at high temperatures. Further, the average thickness of the shell layer is preferably 0.5 to 600 nm.

Also, the content C2 of the phosphorous compound is preferably less than 0.5 mol %. The shell layer is preferably formed with particulates comprising the second olivine-structured lithium-containing phosphate compound. The above composition is advantageous in terms of improving the effect of suppressing elution of metal elements, such as Fe and Mn, from the positive electrode active material particle into the non-aqueous electrolyte.

In addition, another aspect of the present invention relates to a method for producing positive electrode active material particles for lithium ion secondary batteries, the method comprising the steps of:

(a) mixing at least one selected from the group consisting of iron compounds and manganese compounds, a lithium compound, and a phosphoric acid compound, to obtain a starting mixture;

(b) baking the starting mixture at 400 to 1050° C., to obtain core particles; and (c) attaching a shell layer to the surface of the core particles.

The step (c) preferably comprises the steps of:

(c1) heating at 300 to 600° C. by spray pyrolysis, an aqueous precursor solution containing: at least one selected from the group consisting of iron compounds and manganese compounds; a lithium compound; and a phosphoric acid compound, to obtain precursor particulates $P_1$ of a second olivine-structured, lithium-containing phosphate compound;

(c2) baking the precursor particulates $P_1$ at 400 to 800° C., to obtain particulates $P_2$ comprising the second olivine-structured, lithium-containing phosphate compound; and (c3) attaching the particulates $P_2$ to the surface of the core particles by mechanical alloying, to form the shell layer. By taking the above steps, the shell layer can be formed with the particulates comprising the second olivine-structured, lithium-containing phosphate compound.

In addition, a further aspect of the present invention relates to a positive electrode for lithium ion secondary batteries, comprising: a positive electrode current collector; and a positive electrode active material layer including the above-described positive electrode active material particles for lithium ion secondary batteries, the particles being attached to the surfaces of the positive electrode current collector.

In addition, yet another aspect of the present invention relates to a lithium ion secondary battery comprising: the above-described positive electrode for lithium ion secondary batteries; a negative electrode capable of absorbing and releasing lithium ions; a microporous separator for separating the positive and negative electrodes; and a non-aqueous electrolyte.

Advantageous Effects of Invention

According to the present invention, it is possible to improve rate characteristics, and to also improve cycle characteristics even at high temperatures, in a lithium ion secondary battery including an olivine-structured, lithium-containing phosphate compound as a positive electrode active material.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Positive electrode active material particles of the present invention each comprise a core particle and a shell layer attached to the surface of the core particle.

The core particle comprises a first olivine-structured lithium-containing phosphate compound including at least one metal element selected from the group consisting of Fe and Mn. Also, the shell layer comprises a second olivine-structured lithium-containing phosphate compound including at least one metal element selected from the group consisting of Fe and Mn.

In the positive electrode active material particle, at least the core particle includes a phosphorous compound represented by the following formula (1):

$$Me_mP_nO_p \quad (1)$$

where Me is at least one metal element selected from the group consisting of Fe and Mn, $0 < m \leq 3$, $0 < n \leq 3$, and $0 \leq p \leq 5$.

A content C1 of the phosphorous compound relative to the total moles of the first olivine-structured, lithium-containing phosphate compound and the phosphorous compound in the core particle, is 0.5 to 3 mol %. Therefore, it is possible to increase conductivity despite using the olivine-structured, lithium-containing phosphate compound as the positive electrode active material, thus enabling improvement in rate characteristics. When the phosphorous compound is included, Fe and Mn tend to be readily eluted into the non-aqueous electrolyte. However, in the present invention, the shell layer does not include the phosphorous compound represented by the formula (1), or, even if it does, a content C2 of the phosphorous compound relative to the total moles of the second olivine-structured, lithium-containing phosphate compound and the phosphorous compound in the shell layer, is made smaller than the content C1. Therefore, it is possible to effectively suppress elution of Fe and Mn which originate from the phosphorous compound in the core particle. This enables suppression of deterioration of the positive electrode active material particles, thereby enabling improvement in cycle characteristics.

Examples of the phosphorous compound represented by the formula (1) include: metal phosphides such as iron phosphides such as $Fe_2P$ and $Fe_3P$, and manganese phosphides such as $Mn_2P$ and $Mn_3P_2$; metal pyrophosphates such as $Fe_2P_2O_7$ and $Mn_2P_2O_7$; and metal orthophosphates such as $Fe_3(PO_4)_2$ and $Mn_3(PO_4)_2$. These phosphorous compounds may be included in the core particle, singly or in a combination of two or more. Preferred among the above, in terms of conductivity, are the metal phosphides and/or the metal pyrophosphates, and particularly preferred among the metal phosphides are/is the $Fe_2P$ and/or the manganese phosphide $Mn_2P$.

When the shell layer includes the phosphorous compound, the phosphorous compound in the shell layer may be the same as the one included in the core particle, or it may be different therefrom.

The first and second olivine-structured, lithium-containing phosphate compounds are each represented, for example, by the following formula (2):

$$Li_vMe_{1-w}M_w(PO_y)_z \quad (2)$$

where: Me is at least one metal element selected from the group consisting of Fe and Mn; M is at least one element selected from the group consisting of Sc, Y, Cu, Zn, Al, Cr, Pb, Sb, Na, Mg, Ca, Ba, and B; $0 \leq w \leq 0.1$; $0 < v \leq 2$; $3 \leq y \leq 4$; and $0.5 < z \leq 1.5$. Specific examples of the above olivine-structured, lithium-containing phosphate compounds include $LiFePO_4$, $LiMnPO_4$, and $LiFe_{1-e}Mn_ePO_4 (0 < e < 1)$.

The first olivine-structured, lithium-containing phosphate compound and the second olivine-structured, lithium-containing phosphate compound may be of the same kind or of different kinds.

The content C1 of the phosphorous compound relative to the total moles of the first olivine-structured, lithium-containing phosphate compound and the phosphorous compound in the core particle, is 0.5 mol % or more; preferably 0.8 mol % or more; and further preferably 1 mol % or more, or 1.5 mol % or more. Also, the content C1 of the phosphorous compound is 3 mol % or less, preferably 2.2 mol % or less, and further preferably 2 mol %. Such a lower limit and such an upper limit can be arbitrarily combined. For example, the content C1 of the above phosphorous compound may be in the range of 1 to 2 mol %, 1.5 to 2.2 mol %, or the like. When the content C1 of the phosphorous compound is less than 0.5 mol %, conductivity of the positive electrode active material particles lowers and rate characteristics does not improve sufficiently. Also, when the content C1 of the phosphorous compound exceeds 3 mol %, more of the metal components is eluted into the non-aqueous electrolyte, thereby possibly causing deterioration in cycle characteristics at high temperatures.

Note that the content C1 of the phosphorous compound in the core particle can be quantified from the ratio of diffraction peak intensities by using X-ray powder diffraction (XRD). Specifically, the content C1 of the phosphorous compound can be determined by quantifying a content of $Fe_2P$ or the like in the core particle, in the manner of: analyzing the core particle by performing micro X-ray diffraction on a cross section of the positive electrode active material particle; and then subjecting the obtained diffraction pattern to Rietveld refinement. Also, the composition of the core particle can be determined by the ratio of diffraction peak intensities by using XRD.

The content of the phosphorous compound relative to the entire core particle is, for example, 0.5 to 3 mass %, preferably 0.8 to 2.5 mass %, and further preferably 1 to 2 mass %.

The average particle size of the core particle is, for example, 0.1 to 10 μm, preferably 0.5 to 5 μm, and further preferably 0.5 to 2.5 μm. By having the average particle size of the core particle be in the above range, sufficient discharge capacity can be readily secured. Also, the positive electrode active material particles having a moderate particle size can be obtained, thereby facilitating improvement in filling rate of the active material layer, and thus facilitating increase in capacity density. The core particle may be a primary particle or may be formed of a secondary particle which is an aggregate of primary particles. In instances where the core particle is formed of a secondary particle, the average particle size of the primary particle is, for example, 0.05 to 5 μm, preferably 0.1 to 2 μm, and further preferably 0.1 to 1 μm. The average particle size of the core particle may be a number average particle size. The average particle size of the core particle may be measured by, for example, measurement of particle size distribution by laser diffraction.

The shell layer preferably does not include the phosphorous compound, but even if it does, the content C2 therein is preferably smaller than the content C1 in the core particle. The content C2 of the phosphorous compound relative to the total moles of the second olivine-structured, lithium-containing phosphate compound and the phosphorous compound in the shell layer, is, for example, 2 mol % or less, preferably 1 mol % or less, and further preferably less than 0.5 mol %.

The content of the phosphorous compound relative to the entire shell layer is, for example, 0.5 mass % or less, and preferably 0.3 mass % or less. In instances where the shell layer includes the phosphorous compound, the lower limit of the content of the phosphorous compound may be, for example, 0.01 mass %.

The content C2 of the phosphorous compound in the shell layer and the composition of the shell layer can be determined from the ratio of diffraction peak intensities by using XRD, as with the case of the core particle.

The mass of the shell layer is, for example, 0.01 to 55 parts by mass, preferably 0.05 to 50 parts by mass, and further preferably 0.05 to 20 parts by mass or 0.1 to 10 parts by mass, relative to 100 parts by mass of the core particles. By the above range, it is possible to more effectively suppress elution of Fe and Mn from the core particle. Also, it is possible to suppress relative decrease in the content of the phosphorous compound relative to the entire positive electrode active material particle, thus enabling more effective improvement in conductivity.

The average thickness of the shell layer is, for example, 0.5 nm or more; preferably 1 nm or more; and further preferably 5 nm or more, or 50 nm or more. Also, the average thickness of the shell layer is, for example, 600 nm or less; preferably 200 nm or less, or 100 nm or less; and further preferably 50 nm or less, or 10 nm or less. Such a lower limit and such an upper limit may be arbitrarily combined. For example, the average thickness of the shell layer may be 1 to 100 nm, 5 to 50 nm, or 1 to 10 nm, or, in the alternative, may be 50 to 600 nm. By having the average thickness of the shell layer be in the above range, it is possible to more effectively suppress elution of Fe and Mn from the core particle. Also, it is possible to suppress relative decrease in the content of the phosphorous compound relative to the entire positive electrode active material particle, thus enabling more effective improvement in conductivity.

Note that the average thickness of the shell layer can be obtained, based on the result of observation made on the cross section of the positive electrode active material particle with use of a scanning electron microscope (SEM). Specifically, the average thickness of the shell layer can be calculated in the manner of: randomly picking out ten particles of the positive electrode active material particles in one field of view of the SEM; measuring for each particle, the thickness of the shell layer at 10 points; and then averaging out the obtained values.

The proportion of the average thickness of the shell layer in the entire positive electrode active material particle is, for example, 0.01 to 50%, preferably 0.1 to 20%, and further preferably 0.1 to 10%, relative to the average radius of the positive electrode active material particle. Also, the proportion of the average thickness of the shell layer may be 10 to 50% or 15 to 20%, relative to the average radius of the positive electrode active material particle. By having the proportion of the average thickness of the shell layer be in the above range, it is possible to suppress elution of Fe and Mn from the core particle with more effectiveness, and to also improve conductivity. Note that the radius of the positive electrode active material particle can be determined by measuring one of the particles from four directions by using an SEM, and then averaging out the obtained values. The average radius of the positive electrode active material particle can be calculated by: randomly picking out ten particles of the positive electrode active material particles per field of view, for three fields of views of the SEM; and then averaging out the values obtained for the radii of a total of 30 particles thereof.

The average particle size of the positive electrode active material particle, is, for example, 0.1 to 20 μm, preferably 0.5 to 10 μm, and further preferably 0.7 to 3 μm. In instances where the positive electrode active material particle has the above average particle size, improvement in filling ability of the active material layer is facilitated, and increase in capacity density is also facilitated.

The shell layer may be formed of particulates, or may be in film or bulk form.

The shell layer is acceptable, as long as it is formed on at least one part of the surface of the core particle. However, note that in terms of more effectively suppressing elution of Fe and Mn, it is preferable that the shell layer is formed so that it covers, for example, 80% or more and preferably 90% or more of the surface area of the core particle, and further preferably, the entire particle surface.

Figure 1:
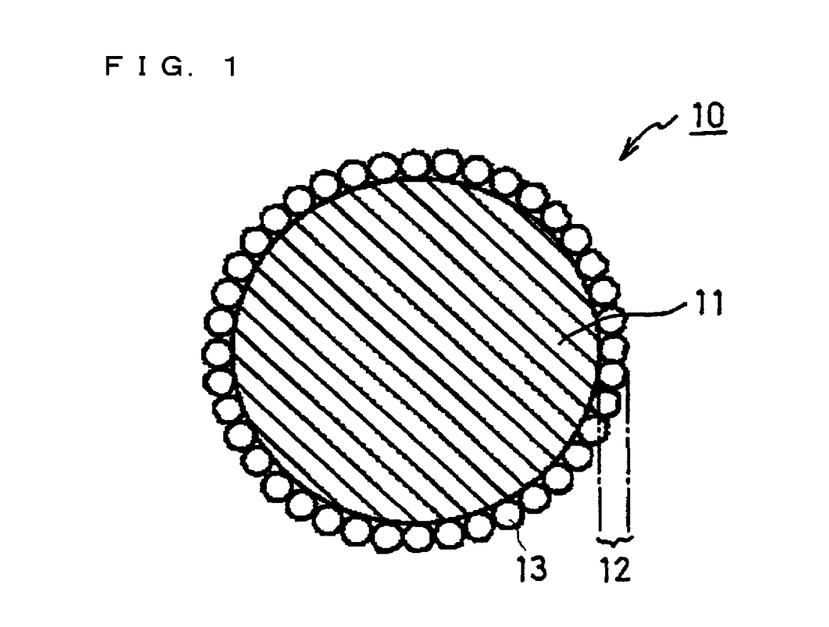
FIG. 1 is a sectional view of a positive electrode active material particle in one embodiment.

With reference to FIG. 1, a description will be given on positive electrode active material particles 10 as one embodiment of the present invention. The positive electrode active material particles 10 each comprise: a core particle 11 comprising a first olivine-structured, lithium-containing phosphate compound and a phosphorous compound; and a shell layer 12 attached to the surface of the core particle 11. The shell layer 12 is formed in the manner of particulates 13, which comprise a second olivine-structured, lithium-containing phosphate compound, being attached to the surface of the core particle 11.

The positive electrode active material particles of the present invention can be obtained by: forming core particles by solid-phase synthesis under certain conditions; and then attaching a shell layer to the surface of the core particles.

Specifically, the positive electrode active material particles can be obtained by taking the steps of: (a) mixing at least one selected from the group consisting of iron compounds and manganese compounds, a lithium compound, and a phosphoric acid compound, to obtain a starting mixture; (b) baking the starting mixture at 400 to 1050° C. to obtain core particles; and (c) attaching a shell layer to the surface of the core particles. In the following, a description will be given on one example of how the positive electrode active material particles are produced.

Step (a)

Each of the compounds which compose the starting mixture may be, with no particular limitation, various raw materials that have been conventionally used for producing olivine-structured, lithium-containing phosphate compounds.

Examples of the lithium compound include lithium hydroxide and lithium carbonate, among which the lithium hydroxide is preferred.

Examples of the iron compounds include: carboxylic acid salts such as ferrous oxalate; and ferrous halides such as ferrous chloride. Examples of the manganese compounds include: carboxylic acid salts such as manganese oxalate and manganese acetate; and manganese halides such as manganese (II) chloride. Preferred among the above are the carboxylic acid salts such as the oxalates.

Also, examples of the phosphoric acid compound include: phosphoric acids such as orthophosphoric acid and pyrophosphoric acid; ammonium phosphates such as ammonium dihydrogenphosphate; and metal phosphates such as iron phosphate and lithium phosphate. Note that at least one selected from lithium, iron, manganese, etc. is preferred as the metal element forming the metal phosphates. Among the above phosphoric acid compounds, the ammonium phosphates are preferred.

These compounds can be used singly or in a combination of two or more.

The respective proportions of the compounds used, can be determined in accordance with: the intended composition of the first olivine-structured, lithium-containing phosphate compound; and the content of the phosphorous compound of the formula (1).

In the step (a), the starting compounds may be dry mixed, or may be wet mixed by coprecipitation after they are dissolved in a solvent. In wet mixing, it is possible to mix the starting compounds in a more uniform manner and to suppress side reactions, thereby enabling obtaining of the positive electrode active material particles in which the content of the phosphorous compound as impurity, is small. Therefore, conventionally, wet mixing is widely employed. In the present invention, dry mixing is preferably employed, since the phosphorous compound needs to be included in the core particle so as to cover a certain proportion therein. This facilitates adjusting the content of the phosphorous compound.

Dry mixing can be performed by using, for example, mills such as ball mills, such as a tumbling ball mill, and bead mills, and/or mixers. Each of the starting compounds or the blended product of the starting compounds, may be sieved or granulated prior to dry mixing. In the alternative, the starting mixture may be sieved and/or granulated.

Step (b)

In the step (b), the starting mixture obtained in the step (a) is baked to obtain the core particles. By the baking in the step (b), the core particles comprising the first olivine-structured, lithium-containing phosphate compound are produced, and the phosphorous compound of the formula (1) is also produced as a by-product in the core particles. The content C1 of the phosphorous compound produced in the core particles can be adjusted as appropriate depending on, for example, baking temperature, baking time, and formulation of the raw materials, and can particularly be readily adjusted depending on baking conditions. Specifically, the content C1 of the phosphorous compound tends to increase by designating a high temperature for the baking temperature.

The baking temperature is 400 ° C. or higher, preferably 600 ° C. or higher, and further preferably 700 ° C. or higher. Also, the baking temperature is 1050° C. or lower, preferably 1000° C. or lower, and further preferably 900° C. or lower. Such a lower limit and such an upper limit may be arbitrarily combined. The baking temperature may be, for example, 400 to 1000° C. or 700 to 900° C. If the baking temperature is lower than 400° C., there would be instances of the content C1 of the phosphorous compound not becoming sufficiently high. If the baking temperature is higher than 1050° C., there would be instances of the content C1 of the phosphorous compound becoming higher than necessary.

The baking time can be selected as appropriate in accordance with the baking temperature, the composition of the starting mixture, etc., and is, for example, 10 to 30 hours, preferably 12 to 24 hours, and further preferably 16 to 20 hours.

Also, baking is preferably performed in an inert gas such as argon gas.

Step (c)

In the step (c), the shell layer comprising the second olivine-structured, lithium-containing phosphate compound is attached to the surface of the core particles obtained in the step (b). The manner of attachment is not particularly limited, and for example, the shell layer may be formed by making particulates comprising the second olivine-structured, lithium-containing phosphate compound attach to the surface of the core particles with use of a binder. In a preferred method (first method), particulates comprising the second olivine-structured, lithium-containing phosphate compound may be attached to the surface of the core particles by mechanical alloying. In another preferred method (second method), a shell layer comprising the second olivine-structured, lithium-containing phosphate compound is formed by: attaching to the surface of the core particles, a starting mixture containing starting compounds of the second olivine-structured, lithium-containing phosphate compound; followed by baking.

In the following, the first and second methods will be described specifically.

(First Method)

In the first method, the shell layer formed of the particulates comprising the second olivine-structured, lithium-containing phosphate compound can be formed, by taking the steps of:

(c1) obtaining precursor particulates $P_1$ of the second olivine-structured, lithium-containing phosphate compound, from an aqueous precursor solution which contains starting compounds of the second olivine-structured, lithium-containing phosphate compounds;

(c2) baking the precursor particulates $P_1$ to obtain particulates $P_2$ which contain the second olivine-structured, lithium-containing phosphate compound; and (c3) attaching the particulates $P_2$ to the surface of the core particles by mechanical alloying to form the shell layer.

In the step (c1), the starting compounds may be: at least one transition metal compound selected from the group consisting of iron compounds and manganese compounds; a lithium compound; and a phosphoric acid compound. For each of the starting compounds, the examples given earlier for the core particles may be used. Iron halides and manganese halides, particularly being chlorides such as ferrous chloride and manganese (II) chloride, are preferred as the transition metal compound. Hydroxides are preferred as the lithium compound, and phosphoric acids such as orthophosphoric acid are preferred as the phosphoric acid compound.

The aqueous precursor solution can be prepared by dissolving the starting compounds in water, and may contain a water-soluble organic solvent such as ethanol or acetone, as necessary.

The precursor particulates $P_1$ may be obtained by, for example, spraying the aqueous precursor solution. The spraying may be performed while heating. In the alternative, granulation may be performed while water is removed by spraying, followed by heating of the obtained particles. The heating temperature is, for example, preferably 300 to 600° C. and further preferably 400 to 550° C. As specific methods, spray drying and spray pyrolysis can be given as examples. By using these methods, it is possible to obtain the precursor particulates which are spherical and particle size-controlled.

Spray pyrolysis is preferred, in terms of increasing the content of the second olivine-structured, lithium-containing phosphate compound in the shell layer. Note that spray pyrolysis is known as one of the wet granulation methods, and is also called spray thermal decomposition. In spray pyrolysis, the aqueous precursor solution is heated at the above temperature while it is being sprayed, thereby removing the solvent and enabling thermal decomposition of the starting compounds.

In the step (c2), the precursor particulates $P_1$ obtained in the step (c1) are baked. The baking temperature is, for example, 400 to 800° C. and preferably 500 to 650° C. Baking performed at the above temperature is advantageous in terms of increasing crystallinity and improving charge and discharge capacities, and increasing the content of the second olivine-structured, lithium-containing phosphate compound in the particulate $P_2$. The baking time can be selected from the same range as that for baking the core particles. Baking can be performed in an inert gas, as with the core particles.

The particulates obtained from the baking may be ground and/or sieved.

The thickness of the shell layer can be adjusted by the particle size of the particulate $P_2$ containing the second olivine-structured, lithium-containing phosphate compound. The average particle size of the particulate $P_2$ is preferably 0.05 to 5 μm, and further preferably 0.1 to 1 μm.

In the step (c3), the particulates $P_2$ are attached to the surface of the core particles by, for example, sufficiently mixing the core particles and the particulates $P_2$ with use of a ball mill such as a tumbling ball mill.

The mixing is not particularly limited, and may be performed while heating or cooling as necessary. However, it can usually be performed at room temperature. The mixing time is, for example, 10 to 30 hours, and preferably 12 to 24 hours.

The thickness of the shell layer can also be adjusted by the amount of the particulates $P_2$ that attaches, that is, by the mix ratio between the core particles and the particulates $P_2$. The mix ratio of the particulates $P_2$ relative to 100 parts by mass of the core particles is, for example: 0.01 to 55 parts by mass; preferably 0.05 to 50 parts by mass; and further preferably 0.05 to 20 parts by mass or 0.1 to 10 parts by mass.

(Second method)

In the second method, the shell layer can be formed by, for example: dispersing the core particles in an aqueous precursor solution which contains the starting compounds of the second olivine-structured, lithium-containing phosphate compound; and then, drying and baking the particles thus obtained. The aqueous precursor solution may be the same as that used in the step (c1) of the first method.

Baking temperature and baking time can be selected from the same ranges as those used in the step (c2) of the first method. Baking can be performed in an inert gas as in the step (c2).

In forming the shell layer, the respective proportions of the starting compounds used, can be determined as appropriate in accordance with: the composition of the second olivine-structured, lithium-containing phosphate compound; and the content C2 thereof.

Next, a description will be given on a positive electrode for lithium ion secondary batteries, which uses the positive electrode active material particles having the above-described core-shell structure.

The positive electrode for lithium ion secondary batteries comprises: a positive electrode current collector; and a positive electrode active material layer attached to the surfaces of the positive electrode current collector, wherein the positive electrode active material layer comprises the above positive electrode active material particles.

The positive electrode current collector may be any current collector usually used in a positive electrode for lithium ion secondary batteries, although not particularly limited thereto. Specifically, the positive electrode current collector may be aluminum, an aluminum alloy, or the like, used in the form of a foil, film, sheet, or the like. The thickness of the positive electrode current collector usually can be designated as appropriate from the range of 1 to 500 µm, in accordance with the capacity, size, etc. of the lithium ion secondary battery.

The positive electrode active material layer can be formed by, for example: preparing a positive electrode material mixture slurry which contains the above-described positive electrode active material particles, a binder, a dispersion medium, and as necessary, an additive such as a conductive agent; applying the slurry on the surfaces of the positive electrode current collector; and then drying and rolling the resultant.

The binder may be any binder usually used in lithium ion secondary batteries, although not particularly limited thereto. Specific examples of the binder include: fluorine-containing polymers such as polytetrafluoroethylene, polyvinylidene fluoride (PVDF) and modified PVDF, tetrafluoroethylene-hexafluoropropylene copolymer, and vinylidene fluoride-tetrafluoroethylene copolymer; rubber-like polymers such as styrene-butadiene rubber and modified SBR; and polyolefinic resins such as polyethylene and polypropylene. These can be used singly or in a combination of two or more.

The dispersion medium may be, for example: water; alcohols such as ethanol; ethers such as tetrahydrofuran; amides such as dimethylformamide; N-methyl-2-pyrollidone (NMP); or mixed solvents thereof.

The conductive agent may be any conductive agent usually used in lithium ion secondary batteries, although not particularly limited thereto. Specific examples include: graphites; carbon blacks such as acetylene black, ketjen black, furnace black, lamp black, and thermal black; carbon fiber; and metal fiber. These can be used singly or in a combination of two or more.

Dispersed in the positive electrode active material layers thus obtained, are the above-described positive electrode active material particles. The positive electrode active material particles enable improved conductivity despite their containing the olivine-structured, lithium-containing phosphate compound, since their core particle contains the phosphorous compound in a predetermined proportion. Also, the shell layer attached to the surface of the core particle either does not contain the phosphorous compound, or they do, and even when they do, the content C2 thereof is smaller than the content C1 of the phosphorous compound in the core particle. Therefore, the positive electrode active material particles, despite their containing the phosphorous compound, enable suppression of elution of Fe and Mn into the non-aqueous electrolyte which is caused by contact made between the positive electrode material mixture layer and the non-aqueous electrolyte, and thus enable suppression of deterioration of the positive electrode which is caused by the non-aqueous electrolyte.

The content of the positive electrode active material particles is preferably 80 to 98 mass %, and further preferably 85 to 96 mass %, relative to the total mass of the positive electrode active material layer. The content of the binder is preferably 10 mass % or less, and further preferably 1 to 5 mass %, relative to the total mass of the positive electrode active material layer. The content of the conductive agent is preferably 20 mass % or less, and further preferably 1 to 15 mass %, relative to the total mass of the positive electrode active material layer.

Next, a description will be given on a lithium ion secondary battery according to the present invention.

The lithium ion secondary battery comprises: the above-described positive electrode for lithium ion secondary batteries; a negative electrode capable of absorbing and releasing lithium ions; a microporous separator for separating the positive electrode and the negative electrode; and a non-aqueous electrolyte.

Figure 2:
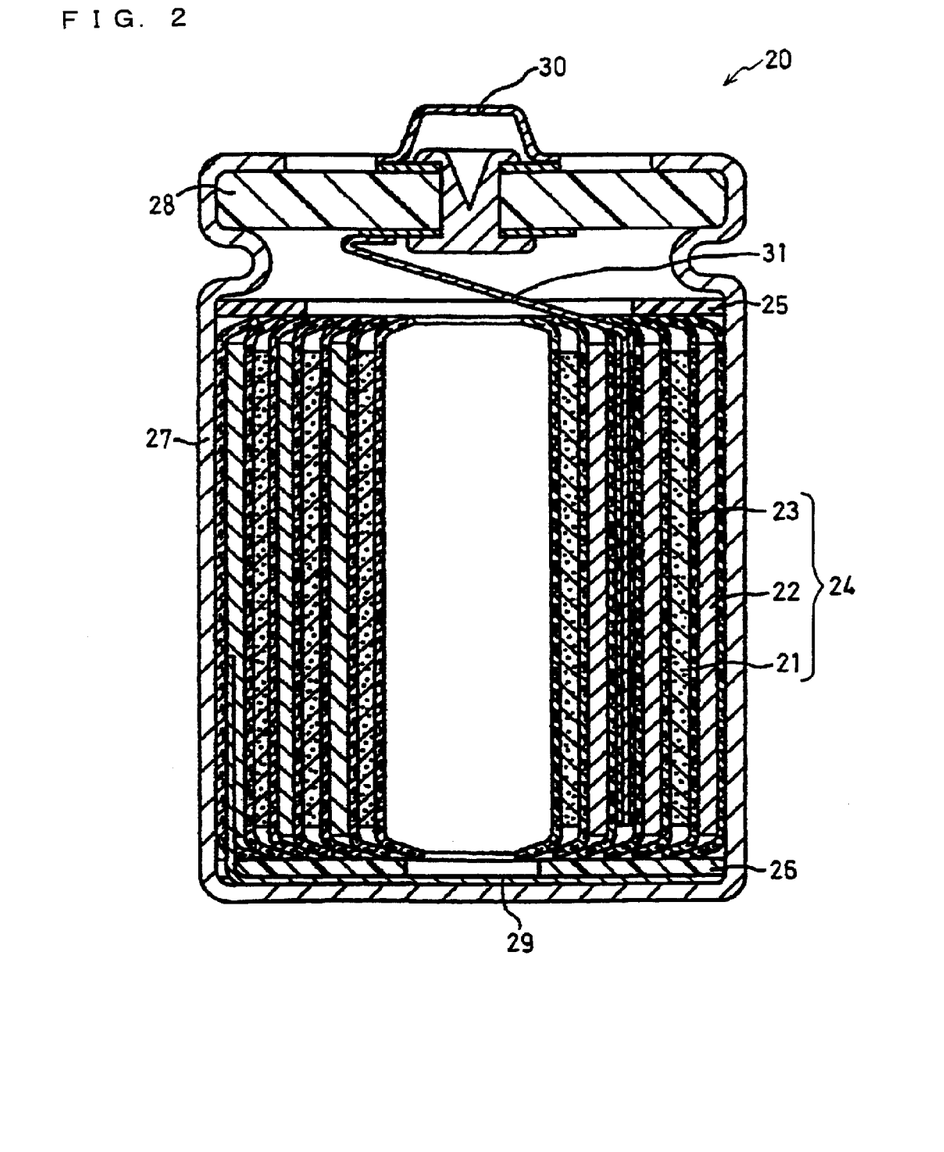
FIG. 2 is a sectional view of a lithium ion secondary battery in one embodiment.

One embodiment of the lithium ion secondary battery is illustrated in FIG. 2. The lithium ion secondary battery 20 comprises an electrode assembly 24 which is the resultant of spirally winding a positive electrode 21, a negative electrode 22, and a microporous separator 23 therebetween. With respect to the electrode assembly 24, a positive electrode-side insulating plate 25 is provided on one end thereof in the winding axis direction, and a negative electrode-side insulating plate 26 is provided on the other end. The electrode assembly 24 is housed, together with a non-aqueous electrolyte, in a battery case 27 which also serves as a negative terminal. The battery case 27 is sealed with a sealing plate 28. The negative electrode 22 in the electrode assembly 24 is electrically connected, via a negative lead 29, to the battery case 27. Also, the positive electrode 21 is electrically connected, via a positive lead 31, to the positive terminal 30 that is attached to the sealing plate 28.

In the following, descriptions will be given on the components other than the positive electrode 21. In the lithium ion secondary battery 20, there is no particular limitation to the components other than the positive electrode 21, and a known configuration for lithium ion secondary batteries can be used as appropriate.

The negative electrode 22 comprises, for example: a negative electrode current collector; a negative electrode active material layer attached to the surface of the negative electrode current collector. The negative electrode active material layer can be formed by: preparing a negative electrode material mixture slurry containing a negative electrode active material, a binder, a dispersion medium, and as necessary, an additive such as a conductive agent; applying the slurry on the surfaces of the negative electrode current collector; and then drying and rolling the resultant.

The negative electrode current collector may be any current collector usually used in a negative electrode for lithium ion secondary batteries, although not particularly limited thereto. Specifically, stainless steel, nickel, copper, or the like may be used in the form of a foil, film, sheet, or the like. The thickness of the negative electrode current collector can be designated as appropriate from the range of 1 to 500 µm, in accordance with the capacity, size, etc. of the lithium ion secondary battery.

The negative electrode active material may be any negative electrode active material capable of absorbing and releasing lithium ions, that is usually used in lithium ion secondary batteries, although not limited thereto. Specifically, examples thereof include: carbon materials such as graphite and amorphous carbon; silicon and the oxides thereof; and tin and the oxides thereof. These can be used singly or in a combination of two or more.

The binder may be any that is used in a negative electrode for lithium ion secondary batteries, although not particularly limited thereto. Specific examples include the examples given for the binder used in the positive electrode active material layer. Examples of the conductive agent include the same ones given as examples for the conductive agent used in the positive electrode active material layer.

The content of the negative electrode active material is preferably 84 to 99 mass %, and further preferably 93 to 98 mass %, relative to the total mass of the negative electrode active material layer. The content of the binder is preferably 1 to 10 mass % relative to the total mass of the negative electrode active material layer. The content of the conductive agent is preferably 15 mass % or less, and further preferably 1 to 6 mass %, relative to the total mass of the negative electrode active material layer.

The microporous separator 23 separates the positive electrode and the negative electrode, by being interposed therebetween. Examples of the microporous separator 23 include a microporous thin film, woven fabric, and non-woven fabric, which are high in ion permeability and sufficient in mechanical strength. The material for the microporous separator is preferably a polyolefin such as polyethylene or polyolefin, in terms of being highly durable and capable of delivering a shutdown function at times of overheating. The thickness of the microporous separator is typically 10 to 300 µm, but is preferably 10 to 40 µm. The microporous separator 23 may be a monolayer film using one material, or a composite film or multilayer film using two or more materials. The porosity of the micorporous separator 23 is preferably 30 to 70%, and further preferably 35 to 60%. Herein, porosity means the proportion of the volume of the pores relative to the total volume of the microporous separator 23.

The non-aqueous electrolyte comprises a non-aqueous solvent, and a lithium salt dissolved therein. The non-aqueous electrolyte is usually in liquid or gelled form.

Examples of the non-aqueous solvent include various non-aqueous solvents usually used in a non-aqueous electrolyte in lithium ion secondary batteries, although not particularly limited thereto. Specifically, examples thereof include: cyclic carbonic acid esters such as ethylene carbonate, propylene carbonate, and butylene carbonate; chain carbonic acid esters such as dimethyl carbonate, ethyl methyl carbonate, and diethyl carbonate; cyclic ethers such as tetrahydrofuran, 1,4-dioxane, and 1,3-dioxolan; chain ethers such as 1,2-dimethoxyethane and 1,2-diethoxyethane; cyclic esters such as γ-butyrolactone; and chain esters such as methyl acetate. These can be used singly or in a combination of two or more.

The lithium salt may be various lithium salts usually used as a solute in a non-aqueous electrolyte in lithium ion secondary batteries. Specific examples include: $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. These can be used singly or in a combination of two or more.

The concentration of the lithium salt in the non-aqueous electrolyte is, for example, 0.5 to 2 mol/L.

In the above description, a spirally-wound cylindrical battery was given as a specific example of the lithium ion secondary battery. However, the shape thereof is not limited to the above. Other than being a cylinder, the lithium ion secondary battery can have a shape of a coin, a prism, a sheet, a button, a flat shape, or a stacked shape, that is selected as appropriate depending on the intended use of the battery.

EXAMPLES

In the following, the present invention will be described with reference to Examples and Comparative Examples. However, note that the present invention is not limited to these Examples.

Example 1

(1) Production of Positive Electrode Active Material Particles

Lithium hydroxide monohydrate, ferrous oxalate dihydrate, and ammonium dihydrogenphosphate were dry mixed at a mole ratio of 1:1:1.

Next, the obtained mixture was baked under an Ar atmosphere at 800° C. for 24 hours, thereby obtaining core particles a1. The core particle a1 was formed of olivine-structured $LiFePO_4$ and $Fe_2P$, and the content of the $Fe_2P$ relative to the total moles of the two compounds was 1.8 mol %.

The content of the $Fe_2P$ in the core particle a1 was measured in the following manner, by using XRD.

A mixture of the core particles a1 and epoxy resin was applied to a surface of a metal plate, followed by drying. Then, the cross section of the core particle a1 was exposed by FIB (Focused Ion Beam) processing. Next, micro X-ray diffraction was performed on the cross sectional part of the core particle a1. The obtained diffraction pattern was subjected to Rietveld refinement, thereby obtaining a $Fe_2P/LiFePO_4$ peak intensity ratio. From the intensity ratio thus obtained, the content of the $Fe_2P$ in the core particle a1 was calculated.

Meanwhile, lithium hydroxide monohydrate, ferrous chloride tetrahydrate, and phosphoric acid were dissolved at a mole ratio of 1:1:1 in distilled water, thereby preparing an aqueous precursor solution. The obtained aqueous precursor solution was atomized by spray pyrolysis at 500° C., followed by drying, thereby obtaining precursor particulates. The precursor particulates thus obtained were baked under an Ar atmosphere at 600° C. for 24 hours, thereby obtaining particulates a2. The particulate a2 was substantially formed of $LiFePO_4$. As a result of measuring the content of the $Fe_2P$ in the particulate a2 in the same manner as the content of the Fe$_2$P in the core particle a1, it was lower than 0.2 mol %, which is typically considered as the detection threshold in X-ray diffraction analysis.

Mechanical alloying was performed by putting 100 parts by mass of the core particles a1 and ten parts by mass of the particulates a2 into a tumbling ball mill, followed by mixing for 24 hours, thereby obtaining positive electrode active material particles A, each in which the particulates a2 were attached to the surface of the core particle a1. As a result of observing the cross section of the obtained positive electrode active material particle A with an SEM, the average particle size of the core particle a1 was 1 μm, the average particle size of the particulate a2 was 100 nm, and the average radius of the positive electrode active material particle A was 600 nm. Also, the average thickness of the shell layer formed from the particulates a2 was 100 nm, and was about 16.7% relative to the average radius of the positive electrode active material particle A. Observation of the cross section of the positive electrode active material particle A was performed by: applying a mixture of the positive electrode active material particles A and epoxy resin to a surface of a metal plate, followed by drying; and then, exposing the cross section of the positive electrode active material particle A by FIB (Focused Ion Beam) processing.

(2) Production of Positive Electrode

Ninety parts by mass of the positive electrode active material particles A, 5 parts by mass of a conductive agent, and 62.5 parts by mass of an NMP solution containing PVDF (PVDF concentration: 8 mass %, PVDF solid content: 5 parts by mass) were mixed, thereby obtaining a positive electrode material mixture slurry. The obtained positive electrode material mixture slurry was applied to both surfaces of a positive electrode current collector being aluminum foil 10 μm in thickness, followed by drying and rolling, thereby obtaining a positive electrode having positive electrode active material layers thereon, its total thickness being 80 μm.

(3) Production of Negative Electrode

Ninety-five parts by mass of artificial graphite powder and 62.5 parts by mass of an NMP solution containing PVDF (PVDF concentration: 8 mass %, PVDF solid content: 5 parts by mass) were mixed, thereby obtaining a negative electrode material mixture slurry. The obtained negative electrode material mixture slurry was applied to both surfaces of a negative electrode current collector being copper foil 10 μm in thickness, followed by drying and rolling, thereby obtaining a negative electrode having negative electrode active material layers thereon, its total thickness being 60 μm.

(4) Preparation of Non-Aqueous Electrolyte

Ethylene carbonate and ethyl methyl carbonate were mixed at a volume-to-volume ratio of 1:3, thereby obtaining a non-aqueous solvent. LiPF$_6$ was dissolved in the non-aqueous solvent thus obtained, so that the LiPF$_6$ concentration therein became 1.0 mol/L, thereby preparing a non-aqueous electrolyte in liquid form.

(5) Production of Lithium Ion Secondary Battery

The positive electrode and the negative electrode were laminated with a microporous separator interposed therebetween, followed by spiral winding, thereby obtaining an electrode assembly. Then, a positive lead made of aluminum was welded to a part of the positive electrode current collector, and a negative lead made of nickel was welded to a part of the negative electrode current collector. The microporous separator was a composite film made of polyethylene and polypropylene (product no. "2300" available from Celgard, LLC., thickness: 25 μm).

The obtained electrode assembly was housed in a cylindrical battery case having a bottom, 18 mm in diameter and 65 mm in height. Then, 5.2 mL of the non-aqueous electrolyte was injected into the battery case. The remainder of production was performed in a conventional manner, thereby obtaining a lithium ion secondary battery as illustrated in FIG. 2. The obtained lithium ion secondary battery had a design capacity of 1100 mAh.

(6) Evaluation of Battery

In the following manner, evaluation was performed on the obtained lithium ion secondary battery, in rate characteristics, and also in cycle characteristics when charge and discharge were performed at a high temperature.

<Rate Characteristics>

The lithium ion secondary battery, of which the end-of-discharge voltage was designated to 3.0 V, was discharged at a rate of 10 C or 0.2 C. Then, the discharge capacity ratio (%) was obtained from: a 10 C discharge capacity [mAh] when discharge was performed at a rate of 10 C; and a 0.2 C discharge capacity [mAh] when discharge was performed at a rate of 0.2 C, based on the following equation.

$$\text{discharge capacity rate(\%)}=(10\text{ C discharge capacity}/0.2\text{ C discharge capacity})\times 100$$

<Cycle Characteristics when Charge and Discharge Were Performed at High Temperature>

On the lithium ion secondary battery, a charge/discharge cycle was repeated under the following conditions. The ambient temperature during charge and discharge was designated to 60° C. First, the battery was charged at a constant current, with the maximum current being 1.1 A, until reaching a voltage of 4.2 V. Then, the battery was charged at a constant voltage of 4.2 V until the current lowered to 50 mA. Next, the battery was discharged at a constant current at a rate of 1 C, with the end-of-discharge voltage being 3.0 V. The rest time between charge and discharge was 30 minutes. This charge/discharge cycle, designated as one cycle, was repeated 100 times. For evaluating cycle characteristics, the discharge capacity after the 100$^{th}$ cycle was expressed in percentage as the capacity retention rate, with the first cycle of the above charge/discharge cycles being regarded as 100%.

Example 2

(Production of Positive Electrode Active Material Particles)

Lithium hydroxide monohydrate, manganese (II) oxalate dihydrate, and ammonium dihydrogenphosphate were mixed at a mole ratio of 1:1:1. Next, the obtained mixture was baked under an Ar atmosphere at 800° C. for 24 hours, thereby obtaining core particles b1. The core particle b1 was formed of olivine-structured LiMnPO$_4$ and Mn$_2$P, and the content of the Mn$_2$P relative to the total moles of the two compounds was 2.0 mol %. The content of the Mn$_2$P in the core particle b1 was measured in the same manner as the content of the Fe$_2$P in the core particle a1 in Example 1.

Meanwhile, lithium hydroxide monohydrate, manganese (II) chloride tetrahydrate, and phosphoric acid were dissolved at a mole ratio of 1:1:1 in distilled water, thereby preparing an aqueous precursor solution. The obtained aqueous precursor solution was atomized by spray pyrolysis at 500° C., followed by drying, thereby obtaining precursor particulates. The precursor particulates thus obtained were baked under an Ar atmosphere at 600° C. for 24 hours, thereby obtaining particulates b2. The particulate b2 was substantially formed of LiMnPO$_4$. As a result of measuring the content of Mn$_2$P in the particulate b2, it was lower than the detection threshold of 0.2 mol %.

Mechanical alloying was performed by putting 100 parts by mass of the core particles b1 and ten parts by mass of the particulates b2 into a tumbling ball mill, followed by mixing for 24 hours, thereby obtaining positive electrode active material particles B, each in which the particulates b2 were attached to the surface of the core particle 1. As a result of observing the cross section of the obtained positive electrode active material particle B with an SEM, the average particle size of the core particle b1 was 1 μm, the average particle size of the particulate b2 was 100 nm, and the average radius of the positive electrode active material particle B was 600 nm. Also, the average thickness of the shell layer formed from the particulates b2 was 100 nm, and was about 16.7% relative to the average radius of the positive electrode active material particle B. Observation of the cross section of the positive electrode active material particle B was performed in the same manner as the cross section of the positive electrode active material particle A in Example 1. Further, except for using the positive electrode active material particles B obtained as above, a lithium ion secondary battery was produced and evaluated in the same manner as Example 1.

Example 3

Core particles c1 were produced in the same manner as Example 1, except for changing the baking temperature during production of the core particles from 800° C. to 600° C. The obtained core particle c1 was formed of $LiFePO_4$ and $FePO_{3.5}$, and the content of the $FePO_{3.5}$ relative to the total moles of the two compounds was 1.0 mol %. Also, the average particle size of the core particle c1 was 1 μm. Except for using the core particles c1 thus obtained and the particulates a2 having an average particle size of 100 nm, positive electrode active material particles C, each in which the particulates a2 were attached to the surface of the core particle c1, were obtained by mechanical alloying in the same manner as Example 1. The average thickness of the shell layer on the positive electrode active material particle C was 100 nm. Further, except for using the positive electrode active material particles C obtained as above, a lithium ion secondary battery was produced and evaluated in the same manner as Example 1.

Example 4

Core particles d1 were produced in the same manner as Example 1, except for changing the baking temperature during production of the core particles from 800° C. to 1000° C. The obtained core particle d1 was formed of $LiFePO_4$ and $Fe_2P$, and the content of the $Fe_2P$ relative to the total moles of the two compounds was 3.0 mol %. The average particle size of the core particle d1 was 1 μm. Except for using the core particles d1 thus obtained and the particulates a2 having an average particle size of 100 nm, positive electrode active material particles D, each in which the particulates a2 were attached to the surface of the core particle d1, were obtained by mechanical alloying in the same manner as Example 1. The average thickness of the shell layer on the positive electrode active material particle D was 100 nm. Further, except for using the positive electrode active material particles D obtained as above, a lithium ion secondary battery was produced and evaluated in the same manner as Example 1.

Example 5

Core particles e1 were produced in the same manner as Example 1, except for changing the baking temperature during production of the core particles from 800° C. to 700° C. The obtained core particles e1 were formed of $LiFePO_4$ and $Fe_2P$, and the content of the $Fe_2P$ relative to the total moles of the two compounds was 0.5 mol %. The average particle size of the core particle e1 was 1 μm. Except for using the core particles e1 obtained as above and the particulates a2 having an average particle size of 100 nm, positive electrode active material particles E, each in which the particulates a2 were attached to the surface of the core particle e1, were obtained by mechanical alloying in the same manner as Example 1. The average thickness of the shell layer of the positive electrode active material particle E was 100 nm. Further, except for using the positive electrode active material particles E obtained as above, a lithium ion secondary battery was produced and evaluated in the same manner as Example 1.

Example 6

Positive electrode active material particles F were obtained in the same manner as Example 1, except for performing mechanical alloying by putting 100 parts by mass of the core particles a1 and 50 parts by mass of the particulates a2 into a tumbling ball mill, followed by mixing for 24 hours. With respect to the positive electrode active material particles F, the particulates a2 having an average particle size of 100 nm were attached to the surface of the core particle a1 having an average particle size of 1 μm. The average radius of the positive electrode active material particle F was 1 μm. As a result of observing the cross section of the obtained positive electrode active material particle F with an SEM in the same manner as Example 1, the average thickness of the shell layer formed from the particulates a2 was about 500 nm, and was 50% relative to the average radius of the positive electrode active material particle F. Further, except for using the positive electrode active material particles F obtained as above, a lithium ion secondary battery was produced and evaluated in the same manner as Example 1.

Example 7

Particulates a2 produced in the same manner as Example 1 were stirred and ground for 48 hours in a planetary ball mill, thereby obtaining particulates a3. As a result of measuring the content of $Fe_2P$ in the particulate a3 in the same manner as the content of the $Fe_2P$ in the core particle a1, it was lower than 0.2 mol %, which is typically considered as the detection threshold in X-ray diffraction analysis.

Positive electrode active material particles G were obtained in the same manner as Example 1, except for performing mechanical alloying by putting 0.1 part by mass of the particulates a3 obtained as above and 100 parts by mass of the core particles a1 in a tumbling ball mill, followed by mixing for two hours. With respect to the positive electrode active material particles G, the particulates a3 having an average particle size of 2 nm were attached to the surface of the core particle a1 having an average particle size of 4 μm. The average radius of the positive electrode active material particle G was about 2 μm. As a result of observing the cross section of the obtained positive electrode active material particle G with an SEM in the same manner as Example 1, the average thickness of the shell layer formed from the particulates a2 was about 2 nm, and was about 0.1% relative to the average radius of the positive electrode active material particle G. Further, except for using the positive electrode active material particles G obtained as above, a lithium ion secondary battery was produced and evaluated in the same manner as Example 1.

Comparative Example 1

The core particles a1 produced in Example 1 was ground so that their average particle size became 1 μm, and were used as positive electrode active material particles H, without the shell layer formed on their respective surfaces. Except for using the positive electrode active material particles H in place of the positive electrode active material particles A, a lithium ion secondary battery was produced and evaluated in the same manner as Example 1.

Comparative Example 2

Lithium hydroxide monohydrate, ferrous chloride tetrahydrate, and phosphoric acid were dissolved at a mole ratio of 1:1:1 in distilled water, thereby preparing an aqueous precursor solution. The obtained aqueous precursor solution was atomized at 500° C. by spray pyrolysis, followed by drying, thereby obtaining precursor particulates. The obtained particulates were then baked under an Ar atmosphere at 600° C. for 24 hours, thereby obtaining particles. The obtained particles were further ground so that their average particle size became 100 nm, thereby obtaining positive electrode active material particles I. The positive electrode active material particle I was substantially formed of $LiFePO_4$, and the content of $Fe_2P$ therein was lower than the detection threshold of 0.2 mol %. Further, except for using the positive electrode active material particles I, a lithium ion secondary battery was produced and evaluated in the same manner as Example 1.

The results of the Examples and Comparative Examples are shown in Table 1. Note that in Examples 1 to 7, the content of the phosphorous compound in the core particle was 1 to 2 mass %.

TABLE 1

| No. | main component of core particle (phosphorous compound and its content in core particle) | shell layer (average thickness) | discharge capacity rate between 10 C and 0.2 C | capacity retention rate after 100 cycles at 60° C., 1 C |
|---|---|---|---|---|
| Ex. 1 | $LiFePO_4$, ($Fe_2P$, 1.8 mol %) | $LiFePO_4$ (100 nm) | 75.8% | 96.0% |
| Ex. 2 | $LiMnPO_4$, ($Mn_2P$, 2.0 mol %) | $LiMnPO_4$ (100 nm) | 67.3% | 95.8% |
| Ex. 3 | $LiFePO_4$, ($FePO_{3.5}$, 1.0 mol %) | $LiFePO_4$ (100 nm) | 72.1% | 96.2% |
| Ex. 4 | $LiFePO_4$, ($Fe_2P$, 3.0 mol %) | $LiFePO_4$ (100 nm) | 80.4% | 85.9% |
| Ex. 5 | $LiFePO_4$, ($Fe_2P$, 0.5 mol %) | $LiFePO_4$ (100 nm) | 69.1% | 96.7% |
| Ex. 6 | $LiFePO_4$, ($Fe_2P$, 1.8 mol %) | $LiFePO_4$ (500 nm) | 72.2% | 97.2% |
| Ex. 7 | $LiFePO_4$, ($Fe_2P$, 1.8 mol %) | $LiFePO_4$ (2 nm) | 78.0% | 76.1% |
| Comp. Ex. 1 | $LiFePO_4$, ($Fe_2P$, 1.8 mol %) | none | 76.1% | 50.2% |
| Comp. Ex. 2 | $LiFePO_4$ | none | 58.0% | 98.6% |

In Examples 1 to 7, a high capacity retention rate was obtained, even after a charge/discharge cycle was repeated 100 times at a high temperature of 60° C. This is presumably because elution of Fe and Mn from the core particle was suppressed, since, for each of the positive electrode active material particles in the Examples, the shell layer was attached to the surface of the core particle. In contrast, in Comparative Example 1, the capacity retention rate lowered after 100 cycles. This is presumably because elution of Fe could not be suppressed, since each of the positive electrode active material particles did not have the shell layer, despite their containing $Fe_2P$.

Additionally, in Examples 1 to 7, the discharge capacity ratio between discharge at 10 C and discharge at 0.2 C was favorable. This is presumably because the effects of voltage drops caused by internal resistance of the battery was able to be suppressed, even at times of high-rate discharge, since the positive electrode active material particles had good conductivity due to their containing, not only $LiFePO_4$ and $LiMnPO_4$, but also $Fe_2P$, $Mn_2P$, or $FePO_{3.5}$. In contrast, in Comparative Example 2, the above discharge capacity ratio lowered. This is presumably because the effects of voltage drops caused by internal resistance of the battery occurred remarkably at times of high-rate discharge, since the positive electrode active material particles substantially did not contain $Fe_2P$.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The positive electrode active material particles of the present invention are highly conductive and improved in rate characteristics, and are therefore suitable for high-rate discharge. Also, their suppression of elusion of Fe and Mn into the non-aqueous electrolyte enables good cycle characteristics at high temperatures. Accordingly, the positive electrode active material particles, positive electrode using the same, and lithium ion secondary battery of the present invention, are useful as the power source for various portable electronic devices such as cellular phones, PDAs (personal digital assistants), laptop computers, digital cameras, and portable game consoles. Also, they can be put into practical use as the driving power supply for vehicles such as electric vehicles and hybrid vehicles.

EXPLANATION OF REFERENCE NUMERALS 10 positive electrode active material particle
11 core particle
12 shell layer
13 particulate
20 lithium ion secondary battery
21 positive electrode
22 negative electrode
23 microporous separator
24 electrode assembly
25 positive electrode-side insulating plate
26 negative electrode-side insulating plate
27 battery case
28 sealing plate
29 negative lead
30 positive terminal
31 positive lead

The invention claimed is:

1. Positive electrode active material particles for lithium ion secondary batteries, the particles each comprising: a core particle; and a shell layer attached to the surface of the core particle, wherein the core particle comprises a first olivine-structured, lithium-containing phosphate compound including: at least one metal element selected from the group consisting of Fe and Mn; and Li, the shell layer comprises a second olivine-structured, lithium-containing phosphate compound including: at least one metal element selected from the group consisting of Fe and Mn; and Li, at least the core particle includes a phosphorous compound represented by the following formula (1):

$$Me_m P_n O_p \qquad (1)$$

where Me is at least one metal element selected from the group consisting of Fe and Mn, $0<m\leq3$, $0<n\leq3$, and $0\leq p\leq5$, a content C1 of the phosphorous compound relative to the total moles of the first olivine-structured, lithium-containing phosphate compound and the phosphorous compound in the core particle, is 0.5 to 3 mol %, and in the case where the shell layer includes the phosphorous compound represented by the formula (1), a content C2 of the phosphorous compound relative to the total moles of the second olivine-structured, lithium-containing phosphate compound and the phosphorous compound in the shell layer, is smaller than the content C1.

2. The positive electrode active material particles for lithium ion secondary batteries in accordance with claim 1, wherein the phosphorous compound includes at least one selected from the group consisting of iron phosphide and manganese phosphide.

3. The positive electrode active material particles for lithium ion secondary batteries in accordance with claim 1, wherein the mass of the shell layer relative to 100 parts by mass of the core particle, is 0.01 to 55 parts by mass.

4. The positive electrode active material particles for lithium ion secondary batteries in accordance with claim 1, wherein the proportion of the average thickness of the shell layer is 0.1 to 50% relative to the average radius of the positive electrode active material particle.

5. The positive electrode active material particles for lithium ion secondary batteries in accordance with claim 1, wherein the average thickness of the shell layer is 0.5 to 600 nm.

6. The positive electrode active material particles for lithium ion secondary batteries in accordance with claim 1, wherein the content C2 of the phosphorous compound is less than 0.5 mol %.

7. The positive electrode active material particles for lithium ion secondary batteries in accordance with claim 1, wherein the shell layer is formed of particulates comprising the second olivine-structured, lithium-containing phosphate compound.

8. A method for producing positive electrode active material particles for lithium ion secondary batteries, the method comprising the steps of:

(a) mixing: at least one selected from the group consisting of iron compounds and manganese compounds; a lithium compound; and a phosphoric acid compound, to obtain a starting mixture, (b) baking the starting mixture at 400 to 1050° C., to obtain core particles comprising a first olivine-structured, lithium-containing phosphate compound including: at least one metal element selected from the group consisting of Fe and Mn; and Li, and (c) attaching to the surface of the core particles, a shell layer comprising a second olivine-structured, lithium-containing phosphate compound including: at least one metal element selected from the group consisting of Fe and Mn; and Li.

9. The method for producing positive electrode active material particles for lithium ion secondary batteries in accordance with claim 8, wherein the step (c) includes the steps of:

(c1) heating an aqueous precursor solution including: at least one selected from the group consisting of iron compounds and manganese compounds; a lithium compound; and a phosphoric acid compound at 300 to 600° C. by spray pyrolysis, to obtain precursor particulates $P_1$ of the second olivine-structured, lithium-containing phosphate compound, (c2) baking the precursor particulates $P_1$ at 400 to 800° C., to obtain particulates $P_2$ comprising the second olivine-structured, lithium-containing phosphate compound, and (c3) attaching the particulates $P_2$ to the surface of the core particles by mechanical alloying, thereby forming the shell layer.

10. A positive electrode for lithium ion secondary batteries comprising: a positive electrode current collector; and a positive electrode active material layer including the positive electrode active material particles for lithium ion secondary batteries in accordance with claim 1, the particles being attached to the surfaces of the positive electrode current collector.

11. A lithium ion secondary battery comprising: the positive electrode for lithium ion secondary batteries in accordance with claim 10; a negative electrode capable of absorbing and releasing lithium ions; a microporous separator for separating the positive electrode and the negative electrode; and a non-aqueous electrolyte.

* * * * *